(12) United States Patent
Bush et al.

(10) Patent No.: US 6,439,261 B1
(45) Date of Patent: Aug. 27, 2002

(54) PRESSURE RESPONSIVE OIL FLOW REGULATING SUPPLY VALVE

(75) Inventors: James W. Bush, Skaneateles; Erric L. Heitmann, Liverpool; Douglas J. Sheahan, Brewerton, all of NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/747,919

(22) Filed: Dec. 22, 2000

(51) Int. Cl.[7] .............................................. G05D 16/02
(52) U.S. Cl. .................................. 137/505.18; 417/295
(58) Field of Search ........................... 137/505.18, 500; 417/295, 441

(56) References Cited

U.S. PATENT DOCUMENTS

| | | | | |
|---|---|---|---|---|
| 2,433,220 A | * | 12/1947 | Huber | 417/295 |
| 3,982,855 A | * | 9/1976 | Aldinger et al. | 417/295 |
| 5,411,375 A | * | 5/1995 | Bauer | 417/295 |

* cited by examiner

*Primary Examiner*—Stephen Hepperle

(57) ABSTRACT

A pressure responsive oil flow regulating supply valve assembly includes an oil supply input; an oil supply output; an oil flow path defined between the input and output. A valving mechanism located in the oil flow path includes a device for restricting oil flow at a first level in response to normal pressure and for restricting oil flow at a second level in response to high pressure conditions. In addition, other levels of restriction may be provided for other pressure conditions.

4 Claims, 3 Drawing Sheets

PRESSURE RESPONSIVE OIL FLOW REGULATING SUPPLY VALVE

TECHNICAL FIELD

This invention is directed to oil flow control and more particularly to an oil-flow regulating supply valve for a compressor which is responsive to changes in pressure for changing oil flow volume to the compressor.

BACKGROUND ART

In compressors, oil is often supplied for lubrication from a pressurized oil sump. Since the oil is pressure-fed an oil pump is typically not used in a compressor system but oil flow is usually regulated by internal oil metering orifices. In low pressure situations, such as at ambient temperature start up where refrigerant pressures are low, the compressor may operate for a period of time without enough pressure differential to allow the supply of oil at an adequate level. Conventionally, an auxiliary oil pump is used to make up the pressure shortage or a variable restriction is provided on the vapor line downstream of the oil separator and sump to induce a pressure differential. Both solutions can be costly and the provision of a variable restriction can cause an undesirable performance penalty.

Also, during normal operation, it may be desirable to regulate oil flow at extreme operating conditions in a manner other than that provided by internal oil metering orifices.

Therefore, a solution is necessary to provide the benefits of an auxiliary pump or vapor line restriction while eliminating the cost and potential performance penalty. It is also desired to provide a more complex, or programmed, regulation of oil flow than that provided by a simple orifice.

DISCLOSURE OF INVENTION

The primary object of this invention is to provide an improved pressure responsive oil flow regulating supply valve for a compressor.

Another object of the present invention is to provide a pressure responsive oil flow regulating supply valve adaptive to multiple pressure situations.

Still another object of the present invention is to provide a pressure responsive oil flow regulating supply valve having a translating spool with varying diameter sections moveable into the oil flow path for regulating oil in response to pressure changes.

And still another object of the present invention is to provide a pressure responsive oil flow regulating supply valve having a translating plunger for exposing one or multiple orifices to oil flow for regulating oil in response to pressure changes.

The foregoing objects and following advantages are achieved by the pressure responsive oil flow regulating supply valve of the present invention which includes an oil supply input; an oil supply output; an oil flow path defined between the input and output; and a valving mechanism located in the oil flow path, the valving mechanism including means for restricting oil flow at predetermined different levels in response to differing pressure conditions.

In one preferred embodiment, the means for restricting preferably comprises a biased spool with multiple portions of differing diameter. Each of the multiple portions has a diameter for restricting flow at one of the predetermined levels in response to varying pressure conditions.

Alternatively, and in another preferred embodiment, the means for restricting comprises a plunger and bore assembly. The plunger translates in the bore formed in the valve assembly housing and the assembly further includes a master orifice and a secondary orifice. The secondary orifice is closed during high pressure for restricted flow and the secondary and master orifices are open during low pressure for increased flow. Additional orifices may also be added to provide additional increments of flow restriction at various pressures.

In another embodiment, the means for restricting further includes means for restricting flow in response to extreme conditions at a first intermediate level between the high level and the low level restrictions.

DETAILED DESCRIPTION OF THE PREFERRED EMBODIMENT

Figure 1:
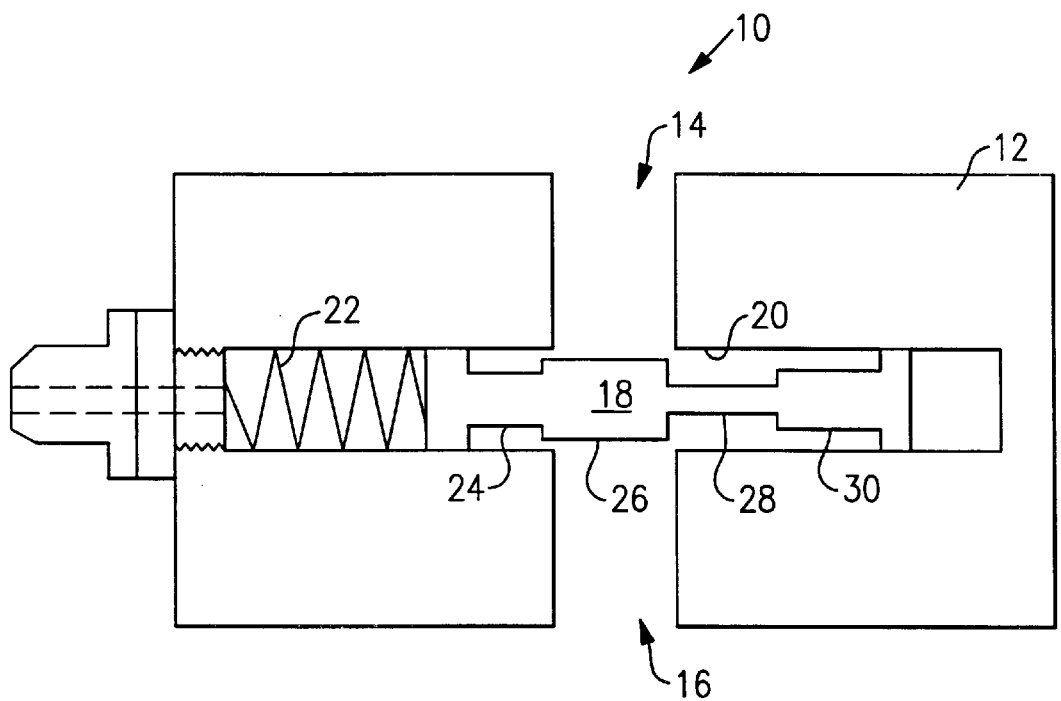
FIG. 1 is a plan view of the first embodiment of the oil flow regulating valve assembly of present invention, shown in the normal pressure and normal oil flow rate state.

Referring now to the drawings in detail, there is shown in FIG. 1 a pressure regulating oil supply valve assembly for use in an air conditioning or refrigeration compressor such as a twin screw compressor, which is designated generally as 10.

The valve assembly 10 generally includes housing 12, oil supply inlet 14, oil supply outlet 16, and spindle 18. Spindle 18 is slideably positioned in a bore 20 within housing 12 and is biased in bore 20 via spring 22. As shown in FIG. 1, the valve assembly is located in the compressor between the oil supply from the separator and the oil supply to the compressor Accordingly, the valve assembly, and specifically spindle 18 operate to variably restrict flow to the compressor in accordance with variable pressure conditions.

Referring still to FIG. 1, spindle 18 includes multiple diameter portions 24, 26, 28, and 30. As shown in FIG. 1, spindle 18 is positioned in bore 20 such that diameter portion 26 is positioned in the oil flow path between the oil supply from the separator to the oil supply to the compressor. The position shown in FIG. 1 is a first level normal pressure position, whereby diameter portion 26 having the largest diameter portion of spindle 18, is positioned in the oil flow path. Accordingly, in normal pressure conditions, spindle 18 operates to regulate flow to the lowest flow rate condition.

Figure 2:
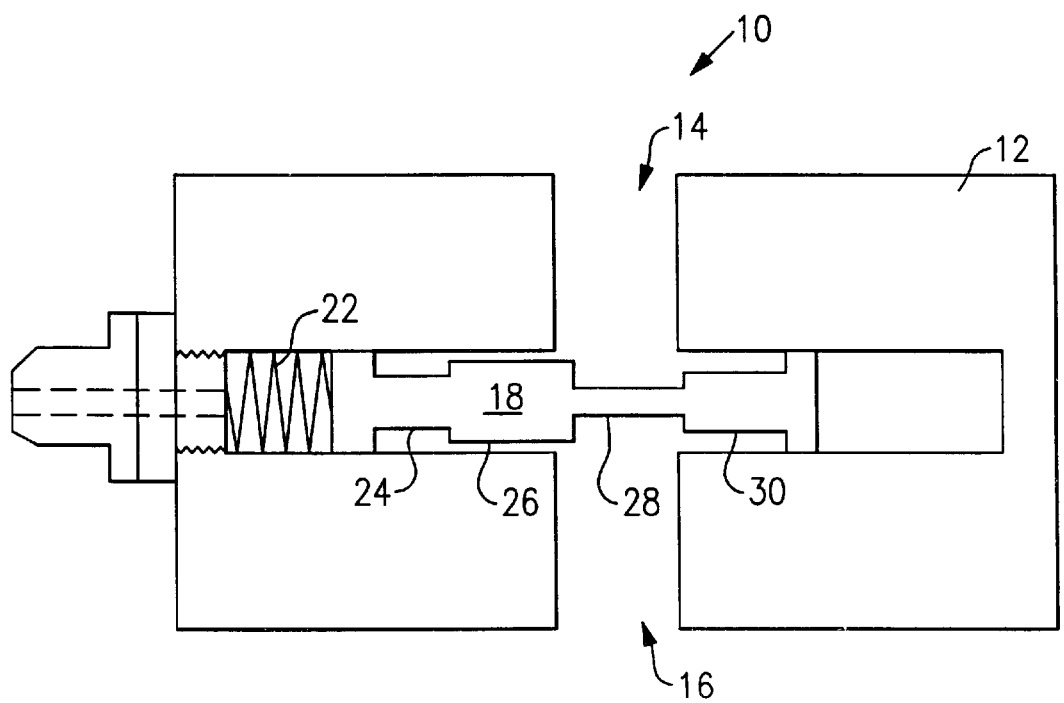
FIG. 2 is a plan view of the valve assembly shown in FIG. 1, in the high pressure, high oil flow rate state.
Figure 3:
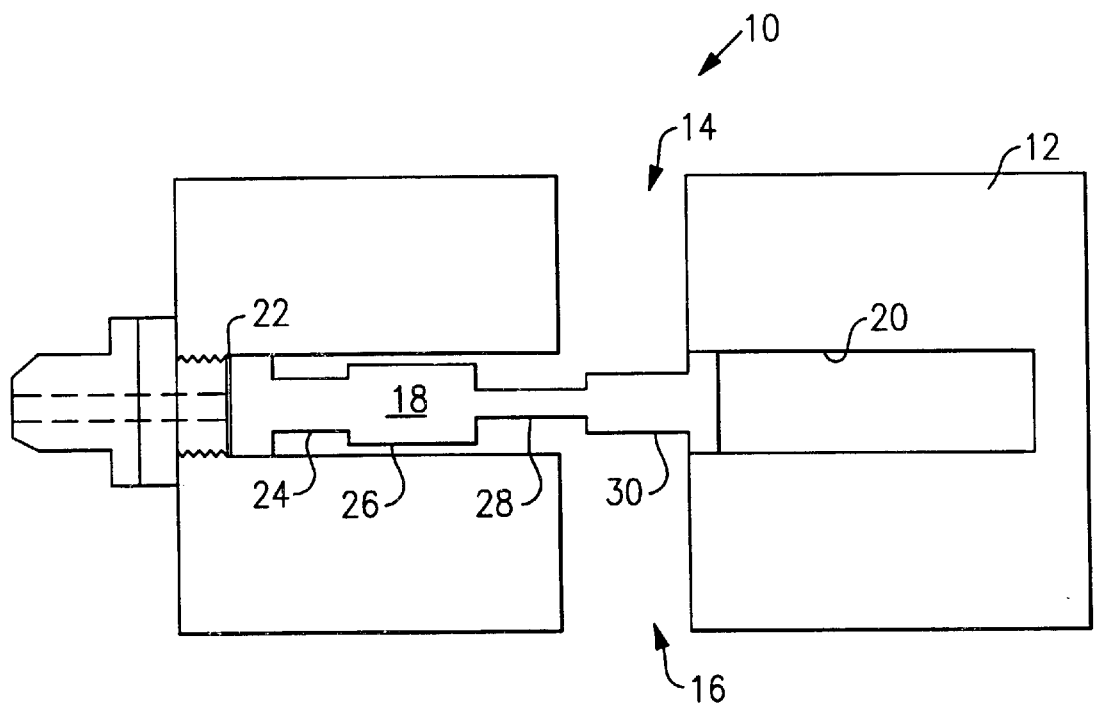
FIG. 3 is a plan view of the valve shown in FIG. 1, in the extreme high pressure, mid-level oil flow rate state.

Referring to FIG. 2, spindle 18 is shown in the high pressure position, whereby diameter portion 28 is positioned in the oil flow path such that at high pressure, a second level minimal flow restriction is provided by spool or spindle 18. As shown in FIG. 3, Spindle 18 has shifted all the way to the left, indicative of an extreme high pressure situation such that oil flow is again restricted, but by diameter portion 30 of Spindle 18 at a third intermediate level between the normal pressure and high pressure spindle restrictions.

Figure 4:
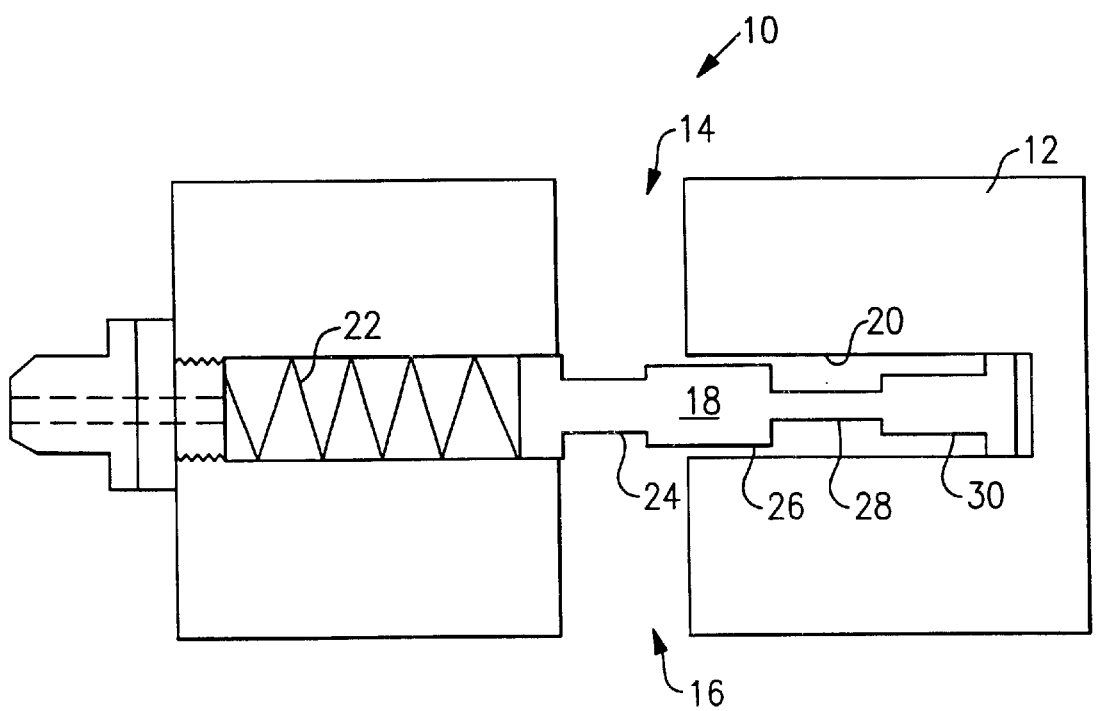
FIG. 4 is a plan view of the valve shown in FIG. 1, in the extreme low pressure, mid-level oil flow rate state.

Finally, as shown in FIG. 4, at extreme low pressure conditions diameter portion 24 is positioned in the oil flow path substantially restricting oil flow, to a fourth level, substantially the same level of restriction provided by diameter portion 30 for the extreme pressure conditions.

The source of pressure is to be, for example, through introduction at the right hand end of the spool or through tapping pressure off the main flow of passage 14–16 to push against the portion of the spool to the left of diameter 24.

In operation, and referring to FIGS. 1–4, spindle 18 is positioned in bore 20 of valve assembly 10 and as shown in FIG. 4, under low pressure start up conditions diameter portion 24 resides in the oil path substantially reducing oil flow. This position would also apply in the case that discharge pressure is lost within the compressor. As indicated in FIG. 1, as a pressure differential builds to normal levels within the compressor, Spindle 18 shifts within bore 20 over the bias of spring 22 such that diameter portion 26 moves into the oil flow path and under these normal conditions, the oil flow is substantially restricted at a maximum level for spindle 18, as made possible by the large diameter portion 26. As indicated in FIG. 2, as pressure differential further increases, under high pressure conditions, spindle 18 shifts to the left against the bias of spring 22 such that diameter portion 28 moves into the flow path of the oil flowing through the valve assembly 10. As shown by the figures, diameter portion 28 is the smallest diameter portion of spindle 18 and accordingly, under high pressure, high volume oil flow is allowed by spindle 18. As shown in FIG. 3, during operation, if an extremely high pressure situation arises, spindle 18 shifts all the way to the left in bore 20 against the bias of spring 22 thereby placing diameter portion 30 in the flow path of the oil flowing from the separator to the compressor. Accordingly, oil flow is restricted at a greater level than as provided by the high pressure position, due to diameter portion 30.

Figure 5:
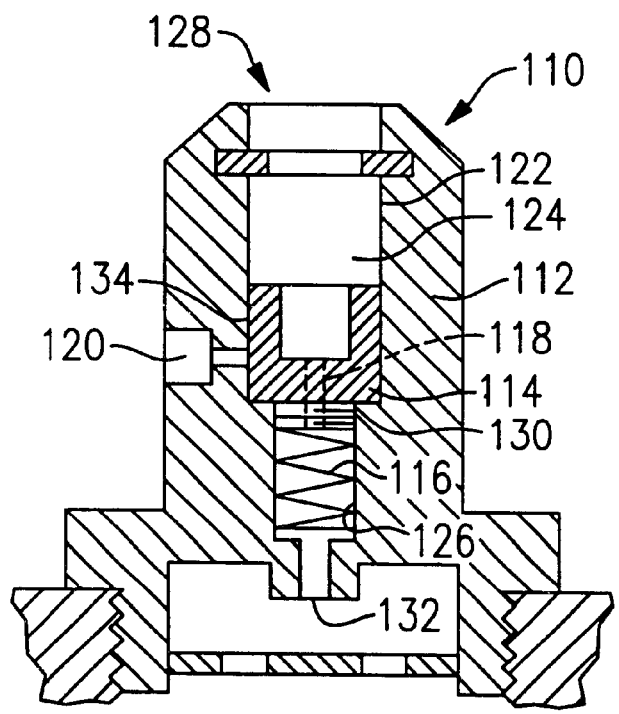
FIG. 5 is a plan view of the second embodiment of the valve of the present invention, shown in the normal pressure and normal oil flow rate state.

Referring now to FIG. 5, a second embodiment of the pressure regulating oil supply valve assembly is shown, fixed to the end of a screw rotor housing defining an oil path between the oil separator and the screw rotor housing. Valve assembly 110 generally includes a housing 112, a translating plunger 114, a biasing spring 116, a master orifice 118, and a secondary orifice 120.

Housing 112 is preferably cylindrical in shape, with plunger 114 residing and translating in a bore 122 therein. As shown, bore 122 includes a large portion 124 and a smaller portion 126, wherein spool 114 resides and translates in large portion 124 and spring 116 resides in small portion 126, biasing plunger 114 toward the oil inlet 128. Master orifice 118 extends through the closed end 130 of plunger 114, allowing flow of oil through spring 116 and out second stage orifice 132 in housing 112, which functions to throttle the oil flow to predetermined flow rates. Secondary orifice 120 extends substantially perpendicularly to master orifice 118 and resides in housing 112 spaced from exit orifice 132 toward oil inlet 128. In the high pressure position as shown in FIG. 5, secondary orifice 132 is blocked for flow therethrough via the outer wall 134 of plunger 114. In low pressure situations as shown in FIG. 6, spring 116 forces plunger 114 toward the oil inlet 128, exposing secondary orifice 120.

Figure 6:
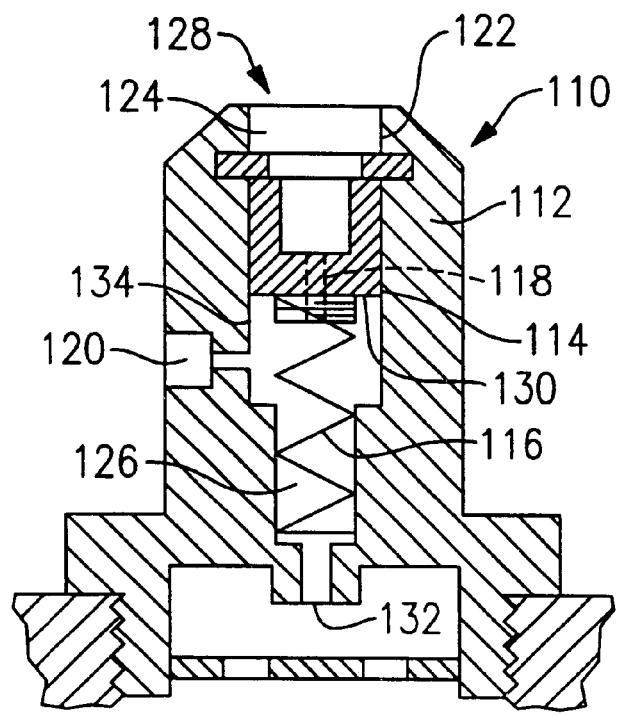
FIG. 6 is a plan view of the valve shown in FIG. 5, in the low pressure, high oil flow rate state.

In operation, and referring to FIGS. 5 and 6, valve assembly 110 is positioned on the screw housing and as shown in FIG. 6 under low pressure or start up conditions both the master and secondary orifices are exposed for high volume oil flow. This position would also apply in the case that discharge pressure is lost within the compressor and a low pressure condition exists, or at start up. As indicated in FIG. 5, as a pressure differential builds within the compressor, plunger 114 translates within large bore portion 124 over the bias of spring 116 such that outer wall 134 of plunger 114 moves over secondary orifice 120, blocking the oil path thereto and allowing oil flow only through the master orifice. Additional orifices could be provided for the purpose of more particularly adjusting oil flow, such that as pressure builds a plurality of orifices are sequentially closed or such that as pressure lessons, a plurality of orifices are sequentially opened. Such additional orifices could be located in housing 120, substantially parallel to secondary orifice 112.

The primary advantage of this invention is that an improved pressure responsive oil flow regulating supply valve is provided for a compressor.

Another advantage of the present invention is that a pressure responsive oil flow regulating supply valve is provided, which is adaptive to multiple pressure situations.

Still another advantage of the present invention is that a pressure responsive oil flow regulating supply valve having a translating spool with varying diameter sections is provided for regulating oil in response to pressure changes.

And still another advantage of the present invention is that a pressure responsive oil flow regulating supply valve is provided, having a translating plunger for exposing one or multiple orifices to oil flow for regulating oil in response to pressure changes.

Although the invention has been shown and described with respect to the best mode embodiment thereof, it should be understood by those skilled in the art that the foregoing and various other changes, omissions, and additions in the form and detail thereof may be made without departing from the spirit and scope of the invention.

What is claimed is:

1. A pressure regulating valve assembly for use in an oil supply line for a compressor operating under variable pressure conditions, comprising:

an oil supply input;

an oil supply output;

an oil flow path defined between said input and output;

a biased translatable spool located in said oil flow path and having multiple portions of differing diameter for restricting but not preventing oil flow at a first level in response to normal pressure and for restricting oil flow at a second level in response to high pressure conditions;

wherein each multiple portion of differing diameter has a diameter different in size from any other portion of differing diameter such that each size is used for adjusting oil flow at different level for a different pressure condition.

2. The pressure regulating oil supply valve according to claim 1, further including a portion of differing diameter for restricting flow at a third level in response to extreme conditions wherein said third level restricts flow at a level between said first level and said second level.

3. The pressure regulating oil supply valve according to claim 2, further including a portion of differing diameter for restricting flow at a fourth level in response to low pressure condition.

4. The pressure regulating valve according to claim 1, wherein said biased spool is biased by a spring, said spool positioned in a bore and slidable in said bore such tat said multiple portions of differing diameter are moved into position in said flow path for restricting flow responsive to pressure conditions.

* * * * *